J. B. BROWN.
NUT LOCK.
APPLICATION FILED NOV. 1, 1907.

977,507.

Patented Dec. 6, 1910.

WITNESSES
Phil E. Barnes.
Rea P. Albright.

INVENTOR
John B. Brown.

UNITED STATES PATENT OFFICE.

JOHN B. BROWN, OF AKRON, OHIO.

NUT-LOCK.

977,507. Specification of Letters Patent. Patented Dec. 6, 1910.

Application filed November 1, 1907. Serial No. 400,243.

*To all whom it may concern:*

Be it known that I, JOHN B. BROWN, a citizen of the United States, residing at Akron, in the county of Summit and State of Ohio, have invented a new and useful Improvement in Nut-Locks, of which the following is a specification.

This invention relates to nut locks, the object being to provide a nut lock which is exceedingly simple and cheap in construction and one which will securely hold the nut in place after it has been screwed tight.

Another object of my invention is to provide a nut lock in connection with a washer so that it will answer two purposes.

Still another object of my invention is to provide a washer with an upwardly and inwardly projecting biting tongue adapted to engage the threads of the bolt so as to prevent the nut from turning.

With these objects in view the invention consists in the novel features of construction, combination and arrangement of parts, hereinafter fully described and pointed out in the claim.

Figure 1:
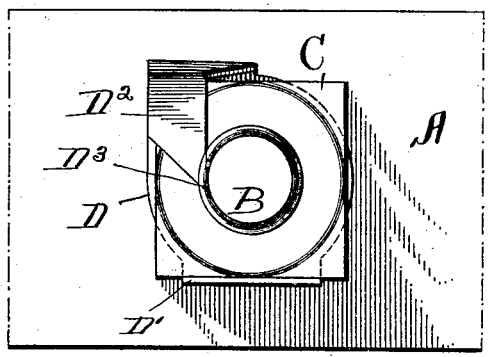
Figure 2:
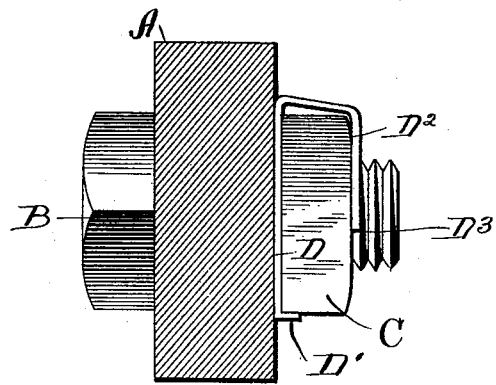
Figure 3:
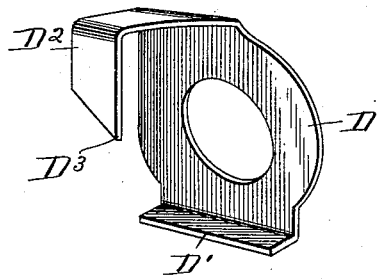

In the drawing forming a part of this specification;—Figure 1 is a top plan view of my improved nut lock showing it arranged on a nut and bolt. Fig. 2 is a side view of the same, and Fig. 3 is a perspective view of my improved nut lock detached.

In the drawing A indicates a piece of material in which is arranged a bolt B on which is mounted a nut C, the above being shown so that the operation of my improved nut lock can be readily understood.

The nut lock comprises a washer D adapted to fit over the bolt, and is provided with a flanged end D' adapted to extend up alongside of the nut C. The tongue $D^2$ projects upwardly and inwardly from the other edge of the washer at one corner, and the end of the tongue is cut off obliquely forming a biting point $D^3$ which is adapted to travel in the groove of the thread of the bolt when being screwed on, and to engage the thread after the nut has been drawn tight, so as to prevent the nut from being unscrewed. The inwardly projecting portion of the tongue resting on the outer face of the nut and in practice the nut is placed on the washer before being screwed on the bolt, and it will be seen that it will be securely held by the tongue, the flanged end D' preventing the washer from turning.

From the foregoing description it will be seen that I have provided a very novel nut lock and washer combined which is formed of spring steel, and is so constructed that it will readily fit over an ordinary nut, it of course being understood that they are made in different sizes to suit different size nuts.

Having thus fully described my invention, what I claim as new and desire to secure by Letters Patent is:—

The combination with a member to be secured having a flat face, of a bolt and nut for securing said member, a washer provided with an opening to receive said bolt arranged between said member and nut, said washer comprising a flat plate provided with a right-angled flange upon one edge extending up alongside of said nut, said plate being provided with an upwardly projecting tongue upon its upper edge and at one corner of the plate, said tongue having an inwardly projecting portion adapted to rest in the threads of said bolt, the end of said tongue being cut off obliquely to form a biting portion adapted to travel in and engage the threads of said bolt.

JOHN B. BROWN.

Witnesses:
VICTOR BROWN,
FLOYD E. SHANNON.